United States Patent
Moorman

(10) Patent No.: US 8,443,687 B2
(45) Date of Patent: May 21, 2013

(54) ELECTRO-HYDRAULIC CONTROL SYSTEM FOR A DUAL CLUTCH TRANSMISSION

(75) Inventor: Steven P. Moorman, Dexter, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 337 days.

(21) Appl. No.: 12/948,927

(22) Filed: Nov. 18, 2010

(65) Prior Publication Data

US 2011/0138956 A1 Jun. 16, 2011

Related U.S. Application Data

(60) Provisional application No. 61/286,311, filed on Dec. 14, 2009.

(51) Int. Cl.
*F16H 59/00* (2006.01)

(52) U.S. Cl.
USPC .......................................................... 74/335

(58) Field of Classification Search
USPC ................ 74/335, 730.1, 731.1, 732.1, 733.1
See application file for complete search history.

(56) References Cited

U.S. PATENT DOCUMENTS

| | | | |
|---|---|---|---|
| 3,774,475 A | 11/1973 | Meysenburg et al. | |
| 3,834,499 A | 9/1974 | Candellero et al. | |
| 4,589,295 A | 5/1986 | Jerry et al. | |
| 4,653,352 A | 3/1987 | Nakao et al. | |
| 4,944,202 A | 7/1990 | Gierer | |
| 5,239,897 A * | 8/1993 | Zaiser et al. | 74/335 |
| 5,441,459 A | 8/1995 | Inukai et al. | |
| 6,698,304 B2 | 3/2004 | Gierling et al. | |
| 6,715,597 B1 | 4/2004 | Buchanan et al. | |
| 6,789,658 B2 | 9/2004 | Busold et al. | |
| 6,827,191 B2 | 12/2004 | Kuhstrebe | |
| 6,883,394 B2 | 4/2005 | Koenig et al. | |
| 6,941,830 B2 | 9/2005 | Ibamoto et al. | |
| 7,300,375 B2 | 11/2007 | Petrzik | |
| 7,401,689 B2 * | 7/2008 | Hegerath et al. | 192/3.58 |
| 7,464,617 B2 | 12/2008 | Baldascini et al. | |
| 7,464,618 B2 | 12/2008 | Mohlmann et al. | |
| 7,472,616 B2 | 1/2009 | Dreher et al. | |
| 7,478,572 B2 | 1/2009 | Maten et al. | |
| 7,487,866 B2 | 2/2009 | Kruse et al. | |
| 7,575,533 B2 | 8/2009 | Gumpoltsberger | |
| 7,591,203 B2 | 9/2009 | Ochi et al. | |
| 7,608,008 B2 | 10/2009 | Seo | |
| 7,621,840 B2 | 11/2009 | Kamm et al. | |
| 8,272,288 B2 * | 9/2012 | Dreher et al. | 74/335 |
| 2001/0036878 A1 | 11/2001 | Itou et al. | |

(Continued)

FOREIGN PATENT DOCUMENTS

| | | |
|---|---|---|
| DE | 2141564 A1 | 2/1973 |
| DE | 4117736 C1 | 5/1992 |

(Continued)

*Primary Examiner* — Troy Chambers
*Assistant Examiner* — Jake Cook

(57) ABSTRACT

A hydraulic control system for a dual clutch transmission includes a source of pressurized hydraulic fluid, first and second actuator control devices in downstream fluid communication with the source of pressurized hydraulic fluid, and first and second clutch control devices in downstream fluid communication with the source of pressurized hydraulic fluid. A valve is in downstream fluid communication with the first and second actuator control devices. Selective activation of combinations of the control devices allows for a pressurized fluid to engage the dual clutch and an actuator in order to shift the transmission into a desired gear ratio.

14 Claims, 5 Drawing Sheets

U.S. PATENT DOCUMENTS

| | | |
|---|---|---|
| 2002/0060113 A1 | 5/2002 | Harries |
| 2002/0119864 A1 | 8/2002 | Harries |
| 2003/0075408 A1 | 4/2003 | Alfredsson |
| 2003/0226416 A1 | 12/2003 | Umemoto et al. |
| 2004/0038765 A1 | 2/2004 | Fujimine et al. |
| 2005/0067251 A1 | 3/2005 | Braford et al. |
| 2005/0107214 A1* | 5/2005 | Koenig .................. 477/174 |
| 2007/0175726 A1 | 8/2007 | Combes et al. |
| 2008/0108472 A1 | 5/2008 | Seo |
| 2008/0108474 A1 | 5/2008 | Seo |
| 2008/0207392 A1 | 8/2008 | Staudinger et al. |
| 2008/0210032 A1* | 9/2008 | Uberti et al. ................ 74/335 |
| 2008/0223683 A1 | 9/2008 | Grethel |
| 2008/0234093 A1 | 9/2008 | Diosi et al. |
| 2008/0242493 A1 | 10/2008 | Carey et al. |
| 2008/0305911 A1 | 12/2008 | Moorman et al. |
| 2009/0000897 A1 | 1/2009 | Staudinger et al. |
| 2009/0017963 A1 | 1/2009 | Hart et al. |
| 2009/0048061 A1 | 2/2009 | Hart et al. |
| 2009/0151495 A1 | 6/2009 | Garabello et al. |
| 2009/0157271 A1 | 6/2009 | Garabello et al. |
| 2009/0221394 A1 | 9/2009 | Phillips et al. |
| 2009/0247351 A1 | 10/2009 | Seo et al. |

FOREIGN PATENT DOCUMENTS

| | | | |
|---|---|---|---|
| DE | 4320353 A1 | 1/1994 |
| DE | 29714652 U1 | 10/1997 |
| DE | 19921301 A1 | 11/1999 |
| DE | 19849488 A1 | 5/2000 |
| DE | 19931973 A1 | 1/2001 |
| DE | 10125172 A1 | 11/2002 |
| DE | 10134115 A1 | 1/2003 |
| DE | 10243282 A1 | 4/2004 |
| DE | 102005029963 A1 | 2/2007 |
| DE | 102005029964 A1 | 3/2007 |
| DE | 102008008454 A1 | 9/2008 |
| DE | 102008058692 A1 | 6/2009 |
| EP | 0477564 A2 | 4/1992 |
| EP | 1400733 A2 | 3/2004 |
| EP | 1433976 A2 | 6/2004 |
| EP | 1469235 A1 | 10/2004 |
| EP | 1519082 A1 | 3/2005 |
| EP | 1589262 A1 | 10/2005 |
| EP | 1645786 A2 | 4/2006 |
| EP | 1767824 A1 | 3/2007 |
| EP | 2151586 A2 | 2/2010 |
| FR | 2808065 A1 | 10/2001 |
| JP | 58102851 A | 8/1983 |
| JP | 2007010145 A | 1/2007 |
| WO | WO9705410 A1 | 2/1997 |
| WO | WO9919644 | 4/1999 |
| WO | WO2004015302 A1 | 2/2004 |
| WO | WO2004097265 A1 | 11/2004 |
| WO | WO2006094711 A1 | 9/2006 |
| WO | WO2009037170 A1 | 3/2009 |
| WO | WO2009048649 A3 | 4/2009 |
| WO | WO2010028745 A2 | 3/2010 |

* cited by examiner

US 8,443,687 B2

ELECTRO-HYDRAULIC CONTROL SYSTEM FOR A DUAL CLUTCH TRANSMISSION

CROSS-REFERENCE TO RELATED APPLICATIONS

This application claims the benefit of U.S. Provisional Application No. 61/286,311 filed on Dec. 14, 2009, which is hereby incorporated in its entirety herein by reference.

TECHNICAL FIELD

The invention relates to a control system for a dual clutch transmission, and more particularly to an electro-hydraulic control system having a plurality of solenoids and a valve operable to actuate a plurality of actuators within the dual clutch transmission.

BACKGROUND

A typical multi-speed, dual clutch transmission uses a combination of two friction clutches and several dog clutch/synchronizers to achieve "power-on" or dynamic shifts by alternating between one friction clutch and the other, with the synchronizers being "pre-selected" for the oncoming ratio prior to actually making the dynamic shift. "Power-on" shifting means that torque flow from the engine need not be interrupted prior to making the shift. This concept typically uses countershaft gears with a different, dedicated gear pair or set to achieve each forward speed ratio. Typically an electronically controlled hydraulic control circuit or system is employed to control solenoids and valve assemblies. The solenoid and valve assemblies actuate clutches and synchronizers to achieve the forward and reverse gear ratios.

While previous hydraulic control systems are useful for their intended purpose, the need for new and improved hydraulic control system configurations within transmissions which exhibit improved performance, especially from the standpoints of efficiency, responsiveness and smoothness, is essentially constant. Accordingly, there is a need for an improved, cost-effective hydraulic control system for use in a dual clutch transmission.

SUMMARY

A hydraulic control system for a dual clutch transmission is provided. In one example of the hydraulic control system, the hydraulic control system includes a source of pressurized hydraulic fluid, a first actuator control device in downstream fluid communication with the source of pressurized hydraulic fluid, a second actuator control device in downstream fluid communication with the source of pressurized hydraulic fluid, a first clutch control device in downstream fluid communication with the source of pressurized hydraulic fluid, and a second clutch control device in downstream fluid communication with the source of pressurized hydraulic fluid. A first clutch actuator is provided for engaging the dual clutch, wherein the first clutch actuator is in downstream fluid communication with the first clutch control device. A second clutch actuator is provided for engaging the dual clutch, wherein the second clutch actuator is in downstream fluid communication with the second clutch control device. A valve is in downstream fluid communication with the first and second actuator control devices. A plurality of actuators are included wherein the plurality of actuators are in downstream fluid communication with the valve. The plurality of actuators are operable to selectively actuate the plurality of synchronizers upon receipt of a flow of pressurized hydraulic fluid.

Further features, aspects and advantages of the present invention will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

DESCRIPTION

Figure 1:
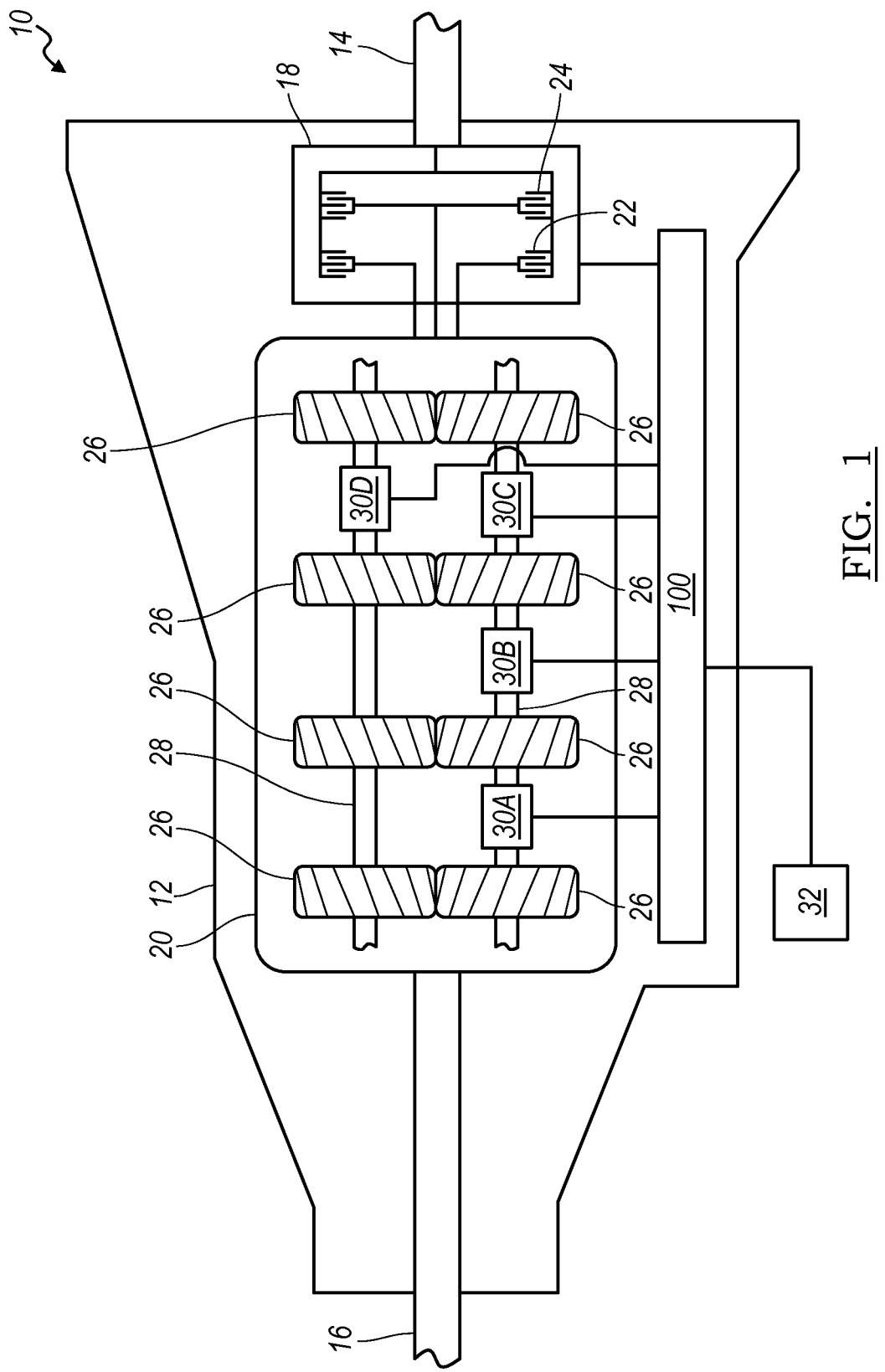
FIG. 1 is a schematic diagram of an exemplary dual clutch automatic transmission controlled by a hydraulic control system according to the principles of the present invention.

With reference to FIG. 1, an exemplary dual clutch automatic transmission incorporating the present invention is illustrated and generally designated by the reference number 10. The transmission 10 includes a typically cast, metal housing 12 which encloses and protects the various components of the transmission 10. The housing 12 includes a variety of apertures, passageways, shoulders and flanges which position and support these components. The transmission 10 includes an input shaft 14, an output shaft 16, a dual clutch assembly 18, and a gear arrangement 20. The input shaft 14 is connected with a prime mover (not shown) such as an internal combustion gas or Diesel engine or a hybrid power plant. The input shaft 14 receives input torque or power from the prime mover. The output shaft 16 is preferably connected with a final drive unit (not shown) which may include, for example, propshafts, differential assemblies, and drive axles. The input shaft 14 is coupled to and drives the dual clutch assembly 18. The dual clutch assembly 18 preferably includes a pair of selectively engageable torque transmitting devices including a first torque transmitting device 22 and a second torque transmitting device 24. The torque transmitting devices 22, 24 are preferably dry clutches. The torque transmitting devices 22, 24 are independently engagable to provide drive torque to the gear arrangement 20.

The gear arrangement 20 includes a plurality of gear sets, indicated generally by reference number 26, and a plurality of shafts, indicated generally by reference number 28. The plurality of gear sets 26 includes individual intermeshing gears that are connected to or selectively connectable to the plurality of shafts 28. The plurality of shafts 28 may include layshafts, countershafts, sleeve and center shafts, reverse or idle shafts, or combinations thereof. It should be appreciated that the specific arrangement and number of the gear sets 26 and the specific arrangement and number of the shafts 28 within the transmission 10 may vary without departing from the scope of the present invention.

The gear arrangement 20 further includes a first synchronizer assembly 30A, a second synchronizer assembly 30B, a third synchronizer assembly 30C and a fourth synchronizer assembly 30D. The synchronizer assemblies 30A-D are operable to selectively couple individual gears within the plurality of gear sets 26 to the plurality of shafts 28. Each synchronizer assembly 30A-D is disposed either adjacent certain single gears or between adjacent pairs of gears within adjacent gear sets 26. Each synchronizer assembly 30A-D, when activated, synchronizes the speed of a gear to that of a shaft and a positive clutch, such as a dog or face clutch. The clutch positively connects or couples the gear to the shaft. The clutch is bi-directionally translated by a shift rail and fork assembly (not shown) within each synchronizer assembly 30A-D.

The transmission also includes a transmission control module or controller 32. The transmission control module 32 is preferably an electronic control device having a preprogrammed digital computer or processor, control logic, memory used to store data, and at least one I/O peripheral. The control logic includes a plurality of logic routines for monitoring, manipulating, and generating data. The transmission control module 32 controls the actuation of the dual clutch assembly 18 and the synchronizer assemblies 30A-D via a hydraulic control system 100 according to the principles of the present invention.

Figure 2A:
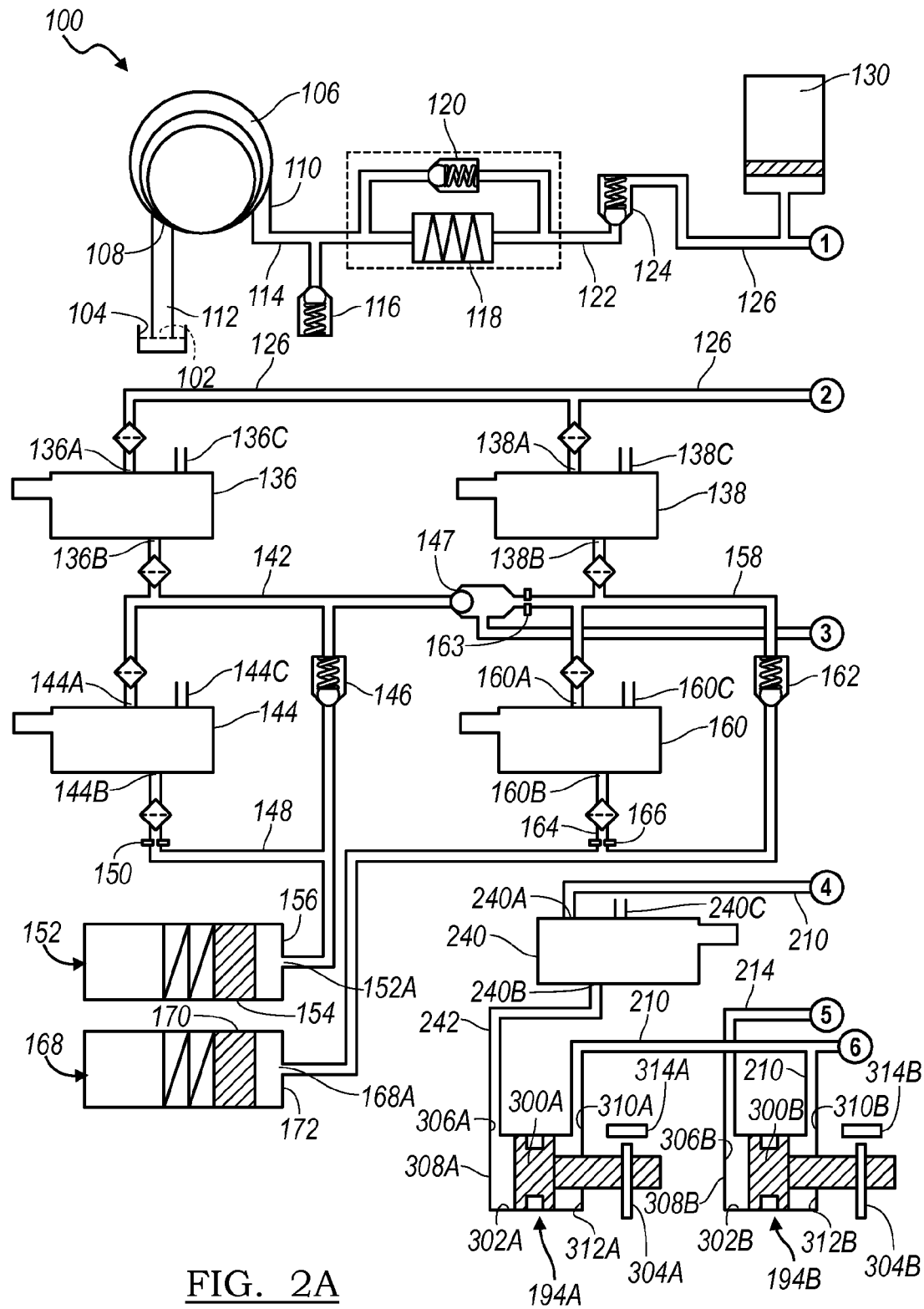
FIGS. 2A and 2B are schematic diagrams of an embodiment of a hydraulic control system for the dual clutch transmission of FIG. 1, according to the principles of the present invention.
Figure 2B:
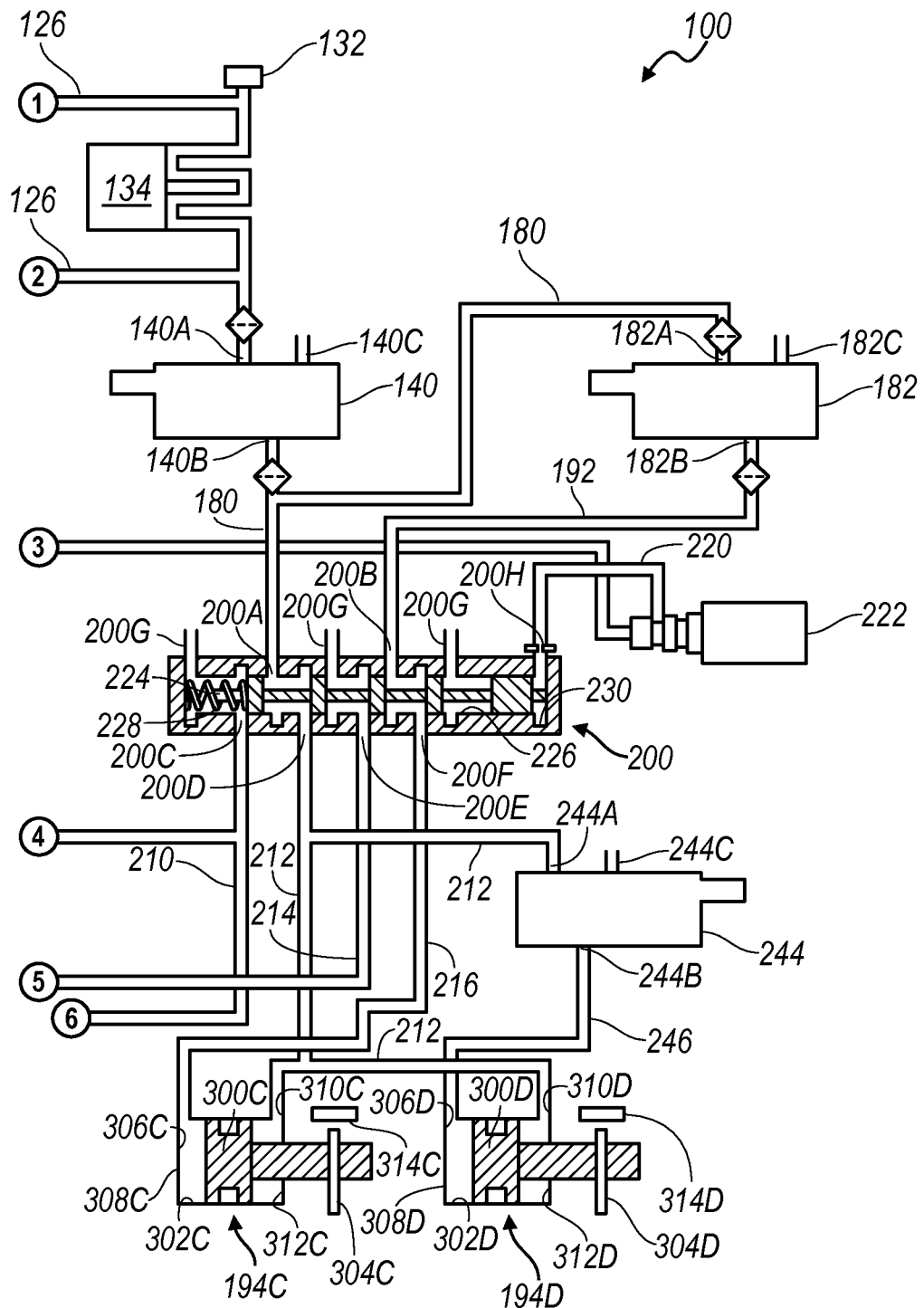

Turning to FIGS. 2A and 2B, the hydraulic control system 100 of the present invention is operable to selectively engage the dual clutch assembly 18 and the synchronizer assemblies 30A-D by selectively communicating a hydraulic fluid 102 from a sump 104 to a plurality of shift actuating devices, as will be described in greater detail below. The sump 104 is a tank or reservoir preferably disposed at the bottom of the housing 12 to which the hydraulic fluid 102 returns and collects from various components and regions of the transmission 10. The hydraulic fluid 102 is drawn or suctioned from the sump 104 via a pump 106. The pump 106 is preferably driven by an electric engine (not shown) or any other type of prime mover and may be, for example, a gear pump, a vane pump, a gerotor pump, or any other positive displacement pump. The pump 106 includes an inlet port 108 and an outlet port 110. The inlet port 108 communicates with the sump 104 via a suction line 112. The outlet port 110 communicates pressurized hydraulic fluid 102 to a supply line 114. The supply line 114 is in communication with a spring biased blow-off safety valve 116, a pressure side filter 118, and a spring biased check valve 120. The spring biased blow-off safety valve 116 communicates with the sump 104. The spring biased blow-off safety valve 116 is set at a relatively high predetermined pressure and if the pressure of the hydraulic fluid 102 in the supply line 114 exceeds this pressure, the safety valve 116 opens momentarily to relieve and reduce the pressure of the hydraulic fluid 102 by allowing fluid 102 to flow into sump 104. The pressure side filter 118 is disposed in parallel with the spring biased check valve 120. If the pressure side filter 118 becomes blocked or partially blocked, pressure within supply line 114 increases and opens the spring biased check valve 120 in order to allow the hydraulic fluid 102 to bypass the pressure side filter 118.

The pressure side filter 118 and the spring biased check valve 120 each communicate with an outlet line 122. The outlet line 122 is in communication with a second check valve 124. The second check valve 124 is in communication with a main supply line 126 and is configured to maintain hydraulic pressure within the main supply line 126. The main supply line 126 supplies pressurized hydraulic fluid 102 to an accumulator 130 and a main pressure sensor 132. The accumulator 130 is an energy storage device in which the non-compressible hydraulic fluid 102 is held under pressure by an external source. In the example provided, the accumulator 130 is a spring type or gas filled type accumulator having a spring or compressible gas that provides a compressive force on the hydraulic fluid 102 within the accumulator 130. However, it should be appreciated that the accumulator 130 may be of other types, such as a gas-charged type, without departing from the scope of the present invention. Accordingly, the accumulator 130 is operable to supply pressurized hydraulic fluid 102 back to the main supply line 126. However, upon discharge of the accumulator 130, the second check valve 124 prevents the pressurized hydraulic fluid 102 from returning to the pump 106. The accumulator 130, when charged, effectively replaces the pump 106 as the source of pressurized hydraulic fluid 102 in main supply line 126, thereby eliminating the need for the pump 106 to run continuously. The main pressure sensor 132 reads the pressure of the hydraulic fluid 102 within the main supply line 126 in real time and provides this data to the transmission control module 32.

The main supply line 126 is channeled through a heat sink 134 used to cool the controller 32, though it should be appreciated that the heat sink 134 may be located elsewhere or removed from the hydraulic control system 100 without departing from the scope of the present invention. Moreover, the main supply line 126 supplies pressurized hydraulic fluid 102 to three pressure control devices including a first clutch pressure control device 136, a second clutch pressure control device 138 and an actuator pressure control device 140.

The first clutch pressure control device 136 is preferably an electrically controlled variable force solenoid having an internal closed loop pressure control. Various makes, types, and models of solenoids may be employed with the present invention so long as the first clutch pressure control device 136 is operable to control the pressure of the hydraulic fluid 102. The first clutch pressure control device 136 includes an inlet port 136A that communicates with an outlet port 136B when the first clutch pressure control device 136 is activated or energized and includes an exhaust port 136C that communicates with the outlet port 136B when the first clutch pressure control device 136 is inactive or de-energized. Variable activation of the first clutch pressure control device 136 regulates or controls the pressure of the hydraulic fluid 102 as the hydraulic fluid 102 communicates from the inlet port 136A to the outlet port 136B. The internal closed loop pressure control provides pressure feedback within the solenoid to adjust the amount of flow to the outlet port 136B based on a particular current command from the controller 32, thereby controlling pressure. The inlet port 136A is in communication with the main supply line 126. The outlet port 136B is in communication with an intermediate hydraulic line 142. The exhaust port 136C is in communication with the sump 104.

The intermediate hydraulic line 142 communicates the hydraulic fluid 102 from the first clutch pressure control device 136 to a first clutch flow control device 144 and to a first and a second pressure limit control valve or check ball valve 146 and 147. The first clutch flow control device 144 is preferably an electrically controlled variable force solenoid that is operable to control a flow of the hydraulic fluid 102 from the first clutch flow control device 144 in order to actuate the first torque transmitting device 22, as will be described in greater detail below. The first clutch flow control device 144 includes an inlet port 144A that communicates with an outlet port 144B when the first clutch flow control device 144 is activated or energized and includes an exhaust port 144C that communicates with the outlet port 144B when the first clutch flow control device 144 is inactive or de-energized. Variable activation of the first clutch flow control device 144 regulates or controls the flow of the hydraulic fluid 102 as the hydraulic fluid 102 communicates from the inlet port 144A to the outlet port 144B. The inlet port 144A is in communication with the intermediate hydraulic line 142. The outlet port 144B is in communication with a first clutch supply line 148 and a flow restriction orifice 150. The exhaust port 144C is in communication with the sump 104. The first pressure limit control valve or check ball valve 146 is disposed in parallel with the first clutch flow control solenoid 144 and is in communication with the intermediate hydraulic line 142 and the first clutch supply line 148. If pressure within the first clutch supply line 148 exceeds a predetermined value, the first pressure limit control valve or check ball valve 146 opens to relieve and reduce the pressure by allowing hydraulic fluid to flow into the intermediate hydraulic line 142.

The first clutch supply line 148 is in fluid communication with an inlet/outlet port 152A of a first clutch piston assembly 152. The first clutch piston assembly 152 includes a single acting piston 154 slidably disposed in a cylinder 156. The piston 154 translates within cylinder 156 under hydraulic pressure to engage the first torque transmitting device 22, shown in FIG. 1. When the first clutch flow control device 144 is activated or energized, a flow of pressurized hydraulic fluid 102 is provided to the first clutch supply line 148. The flow of pressurized hydraulic fluid 102 is communicated from the first clutch supply line 148 to the first clutch piston assembly 152 where the pressurized hydraulic fluid 102 translates the piston 154, thereby engaging the first torque transmitting device 22. When the first clutch flow control solenoid 144 is de-energized, the inlet port 144A is closed and hydraulic fluid from the cylinder 156 is pressed into supply line 148 by piston 154 and then though the outlet port 144B. The first clutch flow control solenoid 144 passes the fluid from outlet port 144B to the exhaust port 144C and into the sump 104, thereby disengaging the first torque transmitting device 22.

The second clutch pressure control device 138 is preferably an electrically controlled variable force solenoid having an internal closed loop pressure control. Various makes, types, and models of solenoids may be employed with the present invention so long as the second clutch pressure control device 138 is operable to control the pressure of the hydraulic fluid 102. The second clutch pressure control device 138 includes an inlet port 138A that communicates with an outlet port 138B when the second clutch pressure control device 138 is activated or energized and includes an exhaust port 138C that communicates with the outlet port 138B when the second clutch pressure control device 138 is inactive or de-energized. Variable activation of the second clutch pressure control device 138 regulates or controls the pressure of the hydraulic fluid 102 as the hydraulic fluid 102 passes from the inlet port 138A to the outlet port 138B. The internal closed loop pressure control provides pressure feedback within the solenoid to adjust the amount of flow of hydraulic fluid 102 to the outlet port 138B based on a particular current command from the controller 32, thereby controlling pressure. The inlet port 138A is in communication with the main supply line 126. The outlet port 138B is in communication with an intermediate fluid line 158. The exhaust port 138C is in communication with the sump 104.

The intermediate fluid line 158 communicates the hydraulic fluid 102 from the second clutch pressure control device 138 to a second clutch flow control device 160, to a third pressure limit control valve or check ball valve 162 and to a flow restriction orifice 163. The second clutch flow control device 160 is preferably an electrically controlled variable force solenoid that is operable to control a flow of the hydraulic fluid 102 from the second clutch flow control device 160 in order to actuate the second torque transmitting device 24, as will be described in greater detail below. The second clutch flow control device 160 includes an inlet port 160A that communicates with an outlet port 160B when the second clutch flow control device 160 is activated or energized and includes an exhaust port 160C that communicates with the outlet port 160B when the second clutch flow control device 160 is inactive or de-energized. Variable activation of the second clutch flow control device 160 regulates or controls the flow of the hydraulic fluid 102 from the inlet port 160A to the outlet port 160B. The inlet port 160A is in communication with the intermediate fluid line 158. The outlet port 160B is in communication with a second clutch supply line 164 and a flow restriction orifice 166. The exhaust port 160C is in communication with the sump 104. The third pressure limit control valve 162 is disposed in parallel with the second clutch flow control solenoid 160 and is in communication with the second clutch supply line 164. If pressure within the second clutch supply line 164 exceeds a predetermined value, the third pressure limit control valve 162 opens to relieve and reduce the pressure.

The second clutch supply line 164 is in fluid communication with an inlet/outlet port 168A of a second clutch piston assembly 168. The second clutch piston assembly 168 includes a single acting piston 170 slidably disposed in a cylinder 172. The piston 170 translates under hydraulic pressure to engage the second torque transmitting device 24, shown in FIG. 1. When the second clutch flow control device 160 is activated or energized, a flow of pressurized hydraulic fluid 102 is provided to the second clutch supply line 164. The flow of pressurized hydraulic fluid 102 is communicated from the second clutch supply line 164 to the second clutch piston assembly 168 where the pressurized hydraulic fluid 102 translates the piston 170, thereby engaging the second torque transmitting device 24. When the second clutch flow control solenoid 160 is de-energized, the inlet port 160A is closed and hydraulic fluid from the cylinder 172 is pressed into supply line 164 by piston 170 and then though the outlet port 160B to the exhaust port 160C and into the sump 104. The second clutch flow control solenoid 160 passes the fluid from outlet port 160B to the exhaust port 160C and into the sump 104, thereby disengaging the second torque transmitting device 24.

The actuator pressure control device 140 is preferably an electrically controlled variable force solenoid having an internal closed loop pressure control. Various makes, types, and models of solenoids may be employed with the present invention so long as the actuator pressure control device 140 is operable to control the pressure of the hydraulic fluid 102. The actuator pressure control device 140 includes an inlet port 140A that communicates with an outlet port 140B when the actuator pressure control device 140 is activated or energized and includes an exhaust port 140C that communicates with the outlet port 140B when the actuator pressure control device 140 is inactive or de-energized. Variable activation of the actuator pressure control device 140 regulates or controls the pressure of the hydraulic fluid 102 as the hydraulic fluid 102 is channeled from the inlet port 140A to the outlet port 140B. More specifically, an internal closed loop pressure control provides pressure feedback within the device 140 to adjust the amount of flow to the outlet port 140B based on a particular current command from the controller 32, thereby controlling pressure. The inlet port 140A is in communication with the main supply line 126. The outlet port 140B is in communication with an valve feed line 180. The exhaust port 140C is in communication with the sump 104.

The valve feed line 180 communicates pressurized hydraulic fluid 102 from the actuator pressure control device 140 to a flow control device 182 and a valve assembly 200. The flow control device 182 is preferably an electrically controlled variable force solenoid. Various makes, types, and models of solenoids may be employed with the present invention so long as the flow control device 182 is operable to control the flow of the hydraulic fluid 102. The flow control device 182 includes an inlet port 182A that communicates through an adjustable hydraulic orifice or restriction with an outlet port 182B when the flow control device 182 is activated or energized and includes an exhaust port 182C that communicates with the outlet port 182B when the flow control device 182 is inactive or de-energized. Variable activation of the adjustable hydraulic orifice or restriction of the flow control device 182 regulates or controls the flow of the hydraulic fluid 102 from the inlet port 182A to the outlet port 182B. The inlet port 182A is in communication with the valve feed line 180. The outlet port 182B is in communication with a valve feed line 192. The exhaust port 182C is in communication with the sump 104.

The pressure control device 140 and flow control device 182 communicate pressurized hydraulic fluid via the valve feed lines 180 and 192 to a valve assembly 200. The valve assembly 200 is operable to direct the flow of pressurized hydraulic fluid 102 from pressure control device 140 and flow control device 182 received via valve feed lines 180 and 192, respectively, to the second synchronizer actuator 194B and to the third synchronizer actuator 194C, as will be described in greater detail below. The valve assembly 200 includes a first inlet port 200A, a second inlet port 200B, a first outlet port 200C, a second outlet port 200D, a third outlet port 200E, a fourth outlet port 200F, a plurality of exhaust ports 200G and a control port 200H. The first inlet port 200A is in communication with valve feed line 180. The second inlet port 200B is in communication with valve feed line 192. The first outlet port 200C is in communication with an actuator supply line 210. The second outlet port 200D is in communication with an actuator supply line 212. The third outlet port 200E is in communication with an actuator supply line 214. The fourth outlet port 200F is in communication with a synchronizer supply line 216. The exhaust ports 200G are ultimately in communication with the sump 104. The control port 200H is in communication with a first control line 220. The control line 220 is in fluid communication with a logic valve solenoid 222.

The valve assembly 200 further includes a valve spool 224 slidably disposed within a valve body or bore 226. The valve spool 224 is moveable between two positions by a biasing member 228 and by fluid flow channeled from the logic valve solenoid 222 via control line 220. The biasing member 228 is preferably a spring and acts on an end of the valve spool 224 to bias the valve spool 224 to the first position or de-stroked position. When the logic valve solenoid 222 is energized or activated a flow of the hydraulic fluid 102 is communicated to the control port 202H via control line 220 and into a control chamber 230 of valve assembly 200. The hydraulic fluid 102 acts on an end of the valve spool 224 to move the valve spool 224 and compress biasing member 228 to place valve spool 224 in the second position or stroked position. A supply of pressurized hydraulic fluid is provided to logic valve solenoid 222 when either the first or second clutch pressure control devices 136, 138 are energized.

When the valve 224 is in the de-stroked position (as shown in FIG. 2B), the first inlet port 200A is in communication with the second outlet port 200D, the second inlet port 200B is in communication with the fourth outlet port 200F, and the first and third outlet ports 200C, 200E are in communication with the exhaust ports 200G. When the valve 224 is in the stroked position, the first inlet port 200A is in communication with the first outlet port 200C, the second inlet port 200B is in communication with the third outlet port 200E, and the second and fourth outlet ports 200D, 200F are in communication with the exhaust ports 200G.

Actuator supply line 210 feeds hydraulic fluid 102 to a fourth flow control device 240 downstream of valve assembly 200. The fourth flow control device 240 is preferably an electrically controlled variable force solenoid that is operable to control a flow of the hydraulic fluid 102 from the valve assembly 200 to actuator 194A, as will be described in greater detail below. The fourth flow control device 240 includes an inlet port 240A that communicates with an outlet port 240B when the fourth flow control device 240 is activated or energized and includes an exhaust port 240C that communicates with the outlet port 240B when the fourth flow control device 240 is inactive or de-energized. Variable activation of the fourth flow control device 240 regulates or controls the flow of the hydraulic fluid 102 from the inlet port 240A to the outlet port 240B. The inlet port 240A is in communication with the actuator supply line 210. The outlet port 240B is in communication with an actuator fluid flow supply line 242. The exhaust port 240C is in communication with the sump 104.

Actuator supply line 212 feeds hydraulic fluid 102 to a fifth flow control device 244 downstream of valve assembly 200. The fifth flow control device 244 is preferably an electrically controlled variable force solenoid that is operable to control a flow of the hydraulic fluid 102 from the valve assembly 200 to actuator 194D, as will be described in greater detail below. The fifth flow control device 244 includes an inlet port 244A that communicates with an outlet port 244B when the fifth flow control device 244 is activated or energized and includes an exhaust port 244C that communicates with the outlet port 244B when the fifth flow control device 244 is inactive or de-energized. Variable activation of the fifth flow control device 244 regulates or controls the flow of the hydraulic fluid from the inlet port 244A to the outlet port 244B. The inlet port 244A is in communication with the actuator supply line 212. The outlet port 244B is in communication with an actuator fluid flow supply line 246. The exhaust port 244C is in communication with the sump 104.

The synchronizer actuators 194A-D are preferably two-area piston assemblies that are each operable to engage or actuate a shift rail in a synchronizer assembly, but can be three-area piston assemblies without departing from the scope of the present invention. For example, the first synchronizer actuator 194A is operable to actuate the first synchronizer assembly 30A, the second synchronizer actuator 194B is operable to actuate the second synchronizer assembly 30B, the third synchronizer actuator 194C is operable to actuate the third synchronizer assembly 30C, and the fourth synchronizer actuator 194D is operable to actuate the fourth synchronizer assembly 30D.

The first synchronizer actuator 194A includes a piston 300A slidably disposed within a piston housing or cylinder 302A. The piston 300A presents two separate areas of different size for pressurized hydraulic fluid to act upon. The piston 300A engages or contacts a finger lever, shift fork, or other shift rail component 304A of the first synchronizer assembly 30A. The first synchronizer actuator 194A includes a fluid port 306A that communicates with a first end 308A of the piston housing or cylinder 302A and a fluid port 310A that communicates with an opposite second end 312A of the piston housing or cylinder 302A. Fluid port 306A is in communication with the actuator fluid flow supply line 242 and fluid port 310A is in communication with the actuator supply line 210. Accordingly, the pressurized hydraulic fluid 102 supplied by the fourth flow control device 240 enters the first end 308A of the piston housing or cylinder 302A of the first synchronizer actuator 194A through the fluid port 306A and the flow of hydraulic fluid 102 from the actuator supply line 210 enters the second end 312A of the piston housing or cylinder 302A of the first synchronizer actuator 194A through the fluid port 310A. The difference in force between the hydraulic fluid 102 delivered to first end 308A and the hydraulic fluid 102 delivered to the second end 312A moves the piston 300A between various positions. Each position in turn corresponds to a position of the shift rail of the first synchronizer assembly 30A (i.e., engaged left, engaged right, and neutral). A fork position sensor 314A may be included to communicate to the controller 32 the position of the shift fork 304A.

The second synchronizer actuator 194B includes a piston 300B slidably disposed within a piston housing or cylinder 302B. The piston 300B presents two separate areas of different size for pressurized hydraulic fluid to act upon. The piston 300B engages or contacts a finger lever, shift fork, or other shift rail component 304B of the second synchronizer assembly 30B. The second synchronizer actuator 194B includes a fluid port 306B that communicates with a first end 308B of the piston housing or cylinder 302B and a fluid port 310B that communicates with an opposite second end 312B of the piston housing or cylinder 302B. Fluid port 306B is in communication with the actuator supply line 214 and fluid port 310B is in communication with the actuator supply line 210. Accordingly, the pressurized hydraulic fluid 102 supplied by actuator supply line 214 enters the first end 308B of the piston housing or cylinder 302B of the second synchronizer actuator 194B through the fluid port 306B and the flow of hydraulic fluid 102 from the actuator supply line 210 enters the second end 312B of the piston housing or cylinder 302B of the second synchronizer actuator 194B through the fluid port 310B. The difference in force between the hydraulic fluid 102 delivered to first end 308B and the hydraulic fluid 102 delivered to the second end 312B moves the piston 300B between various positions. Each position in turn corresponds to a position of the shift rail of the second synchronizer assembly 30B (i.e., engaged left, engaged right, and neutral). A fork position sensor 314B may be included to communicate to the controller 32 the position of the shift fork 304B.

The third synchronizer actuator 194C includes a piston 300C slidably disposed within a piston housing or cylinder 302C. The piston 300C presents two separate areas of different size for pressurized hydraulic fluid to act upon. The piston 300C engages or contacts a finger lever, shift fork, or other shift rail component 304C of the third synchronizer assembly 30C. The third synchronizer actuator 194C includes a fluid port 306C that communicates with a first end 308C of the piston housing or cylinder 302C and a fluid port 310C that communicates with an opposite second end 312C of the piston housing or cylinder 302C. Fluid port 306C is in communication with the synchronizer supply line 216 and fluid port 310C is in communication with the actuator supply line 212. Accordingly, the pressurized hydraulic fluid 102 supplied by synchronizer supply line 216 enters the first end 308C of the piston housing or cylinder 302C of the third synchronizer actuator 194C through the fluid port 306C and the flow of hydraulic fluid 102 from the actuator supply line 212 enters the second end 312C of the piston housing or cylinder 302C of the third synchronizer actuator 194C through the fluid port 310C. The difference in force between the hydraulic fluid 102 delivered to first end 308C from and the hydraulic fluid 102 delivered to the second end 312C moves the piston 300C between various positions. Each position in turn corresponds to a position of the shift rail of the third synchronizer assembly 30C (i.e., engaged left, engaged right, and neutral). A fork position sensor 314C may be included to communicate to the controller 32 the position of the shift fork 304C.

The fourth synchronizer actuator 194D includes a piston 300D slidably disposed within a piston housing or cylinder 302D. The piston 300D presents two separate areas of different size for pressurized hydraulic fluid to act upon. The piston 300D engages or contacts a finger lever, shift fork, or other shift rail component 304D of the fourth synchronizer assembly 30D. The fourth synchronizer actuator 194D includes a fluid port 306D that communicates with a first end 308D of the piston housing or cylinder 302D and a fluid port 310D that communicates with an opposite second end 312D of the piston housing or cylinder 302D. Fluid port 306D is in communication with the actuator fluid flow supply line 246 and fluid port 310D is in communication with the actuator supply line 212. Accordingly, the pressurized hydraulic fluid 102 supplied by the fifth flow control device 244 enters the first end 308D of the piston housing or cylinder 302D of the fourth synchronizer actuator 194D through the fluid port 306D and the flow of hydraulic fluid 102 from the actuator supply line 212 enters the second end 312D of the piston housing or cylinder 302D of the fourth synchronizer actuator 194D through the fluid port 310D. The difference in force between the hydraulic fluid 102 delivered to first end 308D from and the hydraulic fluid 102 delivered to the second end 312D moves the piston 300D between various positions. Each position in turn corresponds to a position of the shift rail of the fourth synchronizer assembly 30D (i.e., engaged left, engaged right, and neutral). A fork position sensor 314D may be included to communicate to the controller 32 the position of the shift fork 304D.

During general operation of the hydraulic control system 100, the accumulator 130 provides the pressurized hydraulic fluid 102 throughout the system and the pump 106 is employed to charge the accumulator 130. Selection of a particular forward or reverse gear ratio is achieved by first selectively actuating one of the synchronizer assemblies 30A-D and then selectively actuating one of the torque transmitting devices 22, 24 to transfer torque to whichever of the synchronizer assemblies 30A-D are engaged. It should be appreciated that the combination of selective engagement of the synchronizer assemblies 30A-D and torque transmitting devices 22, 24 providing a forward or reverse gear ratio may vary without departing from the scope of the present invention.

To engage or actuate the first torque transmitting device 22, the first pressure control solenoid 136 and first clutch flow control device 144 are energized. To engage or actuate the second torque transmitting device 24, the second pressure control solenoid 138 and the second clutch flow control device 160 are energized.

The components of the hydraulic control system 100 are connected via a plurality of fluid communication lines, as described above. It should be appreciated that the fluid communication lines may be integrated in a valve body or formed from separate tubing or piping without departing from the scope of the present invention. In addition, the fluid communication lines may have any cross sectional shape and may include additional or fewer bends, turns, and branches than illustrated without departing from the scope of the present invention. The valve assembly described above is illustrated as spool valve assembly having multiple ports. However, it should be appreciated that other specific types of valves having greater or fewer ports may be provided without departing from the scope of the present invention. Finally, it should be appreciated that the source of pressurized hydraulic fluid, i.e. the pump accumulator 130, pump bypass valve 120, and the engine driven pump 106 may be replaced by alternate hydraulic fluid sources, such as an electrically driven pump.

Figure 3A:
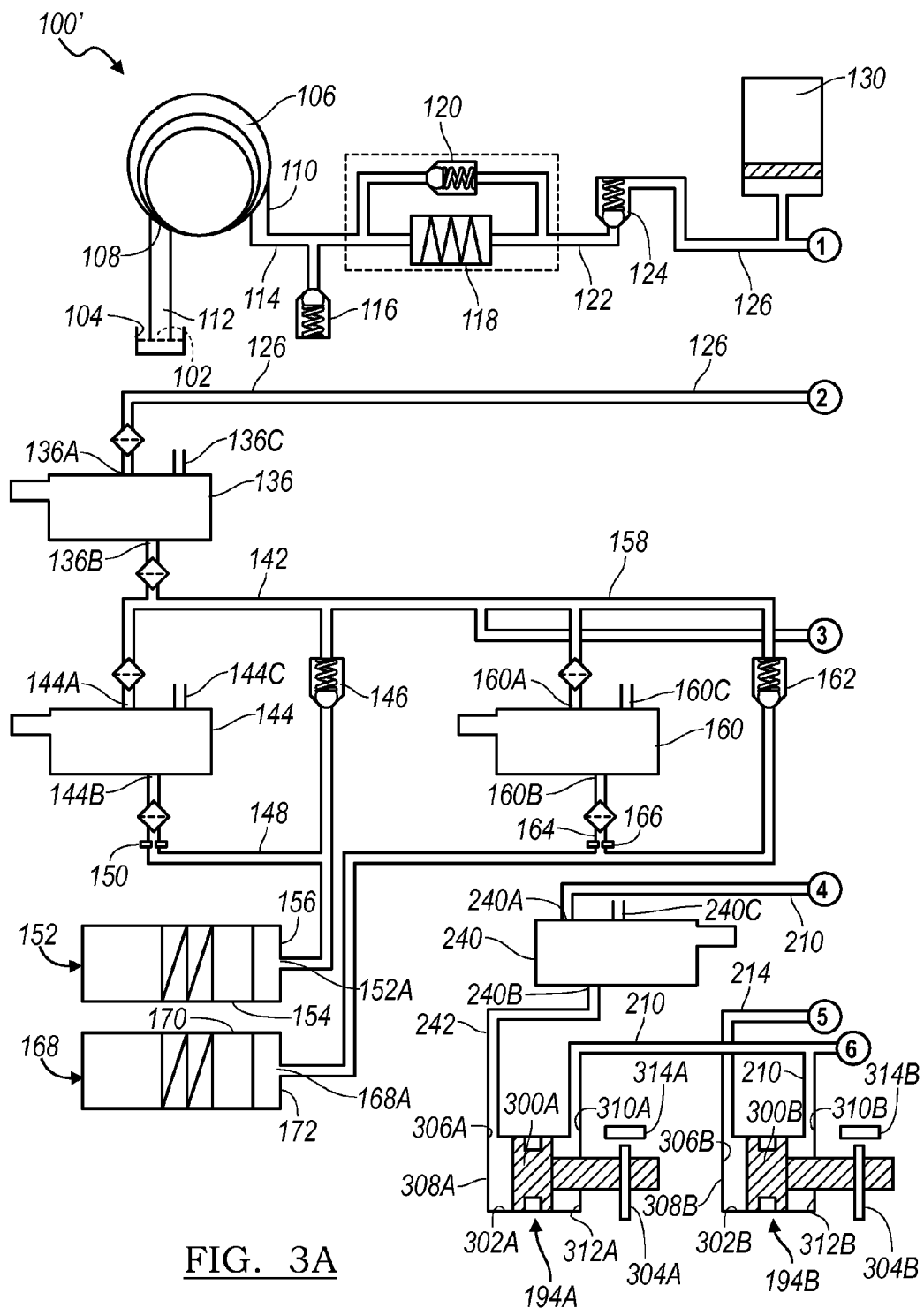
FIGS. 3A and 3B are schematic diagrams of another embodiment of a hydraulic control system for the dual clutch transmission of FIG. 1, according to the principles of the present invention.
Figure 3B:
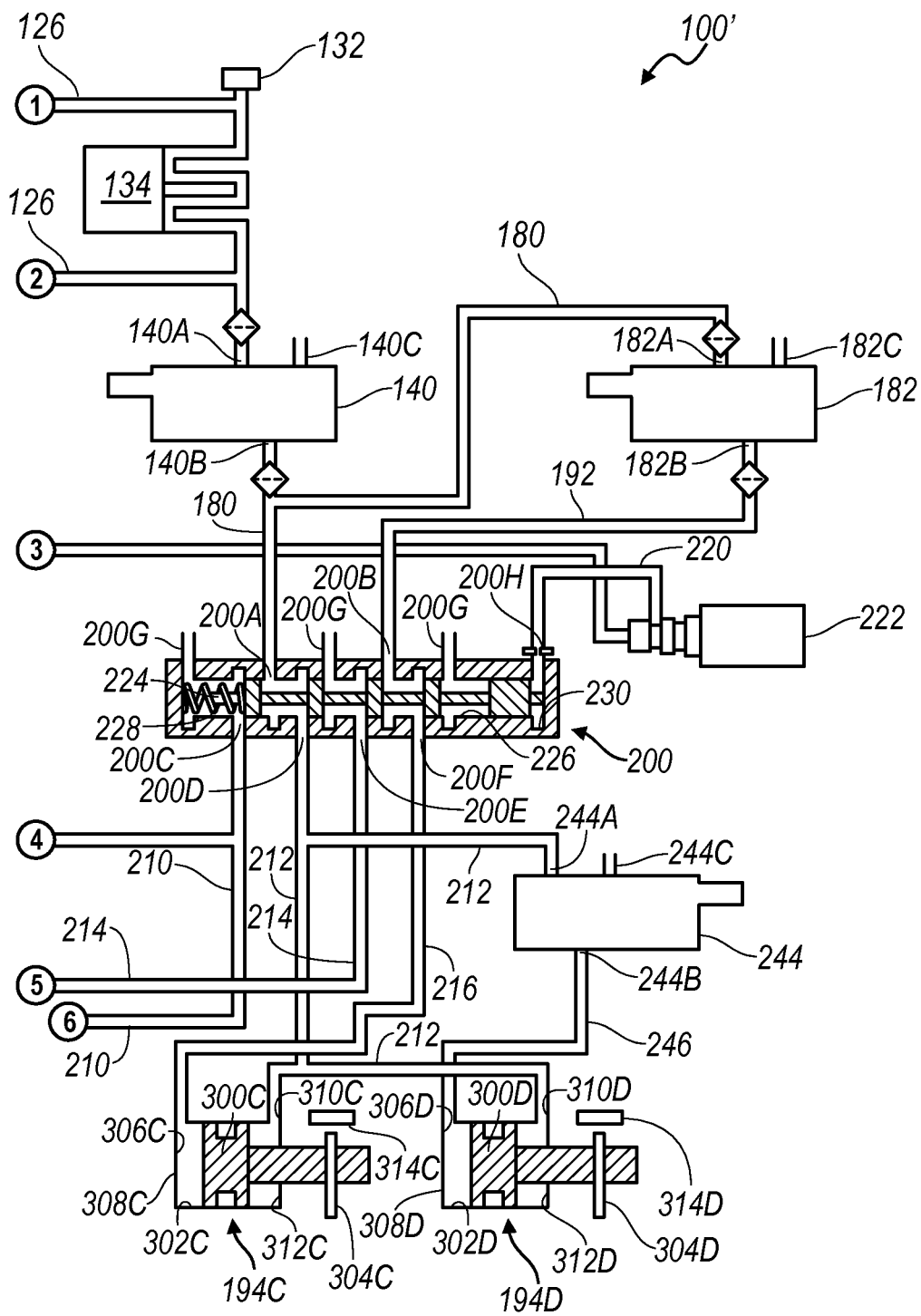

Referring to FIGS. 3A and 3B, another embodiment of a control system for controlling the dual clutch transmission of FIG. 1 is illustrated and referenced as 100'. The control system 100' is substantially similar to control system 100 and has substantially the same components as system 100 with the exception of pressure control device 138, check ball 147 and the flow restriction orifice 163. With pressure control device 138, check ball 147 and the flow restriction orifice 163 removed, pressure control device 136 provides the pressurized hydraulic fluid 102 to fluid line 158. Thus, pressurized fluid 102 is supplied to clutch flow control devices 144 and 160 and solenoid 222.

The description of the invention is merely exemplary in nature and variations that do not depart from the general essence of the invention are intended to be within the scope of the invention. Such variations are not to be regarded as a departure from the spirit and scope of the invention.

The following is claimed:

1. A hydraulic control system for controlling a dual clutch transmission, the hydraulic control system comprising:
   a source of pressurized hydraulic fluid;
   a dual clutch control subsystem in downstream fluid communication with the source of pressurized hydraulic fluid and operable to selectively engage the dual clutch;
   a pressure control solenoid in downstream fluid communication with the source of pressurized hydraulic fluid;
   a first flow control solenoid in downstream fluid communication with the pressure control solenoid;
   a valve assembly in downstream fluid communication with the first flow control solenoid and the pressure control solenoid, wherein the valve assembly has a valve movable between a first and a second position;
   a second flow control solenoid in downstream fluid communication with the valve assembly;
   a third flow control solenoid in downstream fluid communication with the valve assembly;
   a first actuator in downstream fluid communication with the second flow control solenoid and the valve assembly, wherein the first actuator is movable between a first and second position when the valve of the valve assembly is in the second position;
   a second actuator in downstream fluid communication with the valve assembly, wherein the second actuator is movable between a first and second position when the valve of the valve assembly is in the second position;
   a third actuator in downstream fluid communication with the valve assembly, wherein the third actuator is movable between a first and second position when the valve of the valve assembly is in the first position; and
   a fourth actuator in downstream fluid communication with the valve assembly and the third flow control solenoid, wherein the fourth actuator is movable between a first and second position when the valve of the valve assembly is in the first position,
   wherein the pressure control solenoid generates a first hydraulic fluid pressure to move at least one of the third and fourth actuators into the second position when the valve is in the first position and to move at least one of the first and second actuators into the second position when the valve is in the second position,
   wherein the first flow control solenoid generates a first flow of hydraulic fluid to move at least one of the second and third actuators into the first position, the second flow control solenoid generates a second flow of hydraulic fluid to move the first actuator into the first position and the third flow control solenoid generates a third flow of hydraulic fluid to move the fourth actuator into the first position, and
   wherein selective engagement of the first, second, third, and fourth actuators and selective engagement of the dual clutch by the dual clutch control subsystem controls the transmission.

2. The hydraulic control system of claim 1 further comprising a valve control solenoid in downstream fluid communication with the dual clutch control subsystem and in upstream fluid communication with the valve assembly.

3. The hydraulic control system of claim 2 wherein the valve control solenoid is configured to communicate a second pressurized hydraulic fluid from the dual clutch control subsystem to the valve assembly in order to move the valve of the valve assembly to at least one of the first and second positions.

4. The hydraulic control system of claim 2 further comprising a ball check valve disposed between the dual clutch control subsystem and the valve control solenoid.

5. The hydraulic control system of claim 1 wherein the dual clutch control subsystem includes:
   a clutch pressure control solenoid in downstream fluid communication with the source of pressurized hydraulic fluid;
   a fourth flow control solenoid in downstream fluid communication with the clutch pressure control solenoid;
   a fifth flow control solenoid in downstream fluid communication with the clutch pressure control solenoid;
   a first clutch actuator in downstream fluid communication with the fourth flow control solenoid for selectively actuating a first clutch of the dual clutch transmission; and
   a second clutch actuator in downstream fluid communication with the fifth flow control solenoid for selectively actuating a second clutch of the dual clutch transmission.

6. The hydraulic control system of claim 1 wherein the dual clutch control subsystem includes:
   first and second clutch pressure control solenoids each in downstream fluid communication with the source of pressurized hydraulic fluid;
   a fourth flow control solenoid in downstream fluid communication with the first clutch pressure control solenoid;
   a fifth flow control solenoid in downstream fluid communication with the second clutch pressure control solenoid;
   a first clutch actuator in downstream fluid communication with the fourth flow control solenoid for selectively actuating a first clutch of the dual clutch transmission; and
   a second clutch actuator in downstream fluid communication with the fifth flow control solenoid for selectively actuating a second clutch of the dual clutch transmission.

7. A hydraulic control system for controlling a dual clutch transmission having a plurality of synchronizers, the hydraulic control system comprising:
   a source of pressurized hydraulic fluid;
   a first, a second, and a third pressure control solenoid each having an inlet port in downstream fluid communication with the source of pressurized hydraulic fluid and each having an outlet port;
   a first flow control solenoid having an inlet port in downstream fluid communication with the outlet port of the first pressure control solenoid and having an outlet port;

a second flow control solenoid having an inlet port in downstream fluid communication with the outlet port of the second pressure control solenoid and having an outlet port;

a first clutch actuator in downstream fluid communication with the outlet port of the first flow control solenoid, the first clutch actuator configured to selectively actuate a first clutch of the dual clutch transmission;

a second clutch actuator in downstream fluid communication with the outlet port of the second flow control solenoid, the second clutch actuator configured to selectively actuate a second clutch of the dual clutch transmission;

a third flow control solenoid having an inlet port in downstream fluid communication with the outlet port of the third pressure control solenoid and having an outlet port;

a valve assembly having a first inlet in downstream fluid communication with the outlet port of the third pressure control solenoid, a second inlet in downstream fluid communication with the outlet port of the third flow control solenoid, and a first, a second, a third, and a fourth outlet port, wherein the valve assembly has a valve movable between a first and a second position, wherein the first inlet is in fluid communication with the second outlet port and the second inlet is in fluid communication with the fourth outlet port when the valve is in the first position and wherein the first inlet is in fluid communication with the first outlet port and the second inlet is in fluid communication with the third outlet port when the valve is in the second position;

a fourth flow control solenoid having an inlet port in downstream fluid communication with the first outlet port of the valve assembly and having an outlet port;

a fifth flow control solenoid having an inlet port in downstream fluid communication with second outlet port of the valve assembly and having an outlet port;

a first actuator in downstream fluid communication with the first outlet port of the valve assembly and the outlet port of the fourth flow control solenoid, wherein the first actuator is movable between a first and second position when the valve of the valve assembly is in the second position;

a second actuator in downstream fluid communication with the first and third outlet ports of the valve assembly, wherein the second actuator is movable between a first and second position when the valve of the valve assembly is in the second position;

a third actuator in downstream fluid communication with the second and fourth outlet ports of the valve assembly, wherein the third actuator is movable between a first and second position when the valve of the valve assembly is in the first position; and a fourth actuator in downstream fluid communication with the second outlet port of the valve assembly and with the outlet port of the fifth flow control solenoid, wherein the fourth actuator is movable between a first and second position when the valve of the valve assembly is in the first position, and wherein selective engagement of the first, second, third, and fourth actuators controls the plurality of synchronizers and selective engagement of the first and second clutch actuators controls the first and second clutches.

8. The hydraulic control system of claim 7 wherein the first actuator is movable between the first and second position when the valve of the valve assembly is in the second position and a flow of hydraulic fluid from the fourth flow control solenoid generates a force on the first actuator that is greater than or less than a force on the first actuator generated by a pressurized hydraulic fluid from the third pressure control solenoid, the second actuator is movable between the first and second position when the valve of the valve assembly is in the second position and a flow of hydraulic fluid from the third flow control solenoid generates a force on the second actuator that is greater than or less than a force on the second actuator generated by a pressurized hydraulic fluid from the third pressure control solenoid, the third actuator is movable between the first and second position when the valve of the valve assembly is in the first position and a flow of hydraulic fluid from the third flow control solenoid generates a force on the third actuator that is greater than or less than a force on the third actuator generated by a pressurized hydraulic fluid from the third pressure control solenoid, and the fourth actuator is movable between the first and second position when the valve of the valve assembly is in the first position and a flow of hydraulic fluid from the fifth flow control solenoid generates a force on the fourth actuator that is greater than or less than a force on the fourth actuator generated by a pressurized hydraulic fluid from the third pressure control solenoid.

9. The hydraulic control system of claim 7 further comprising a ball check valve having a first inlet in downstream fluid communication with the outlet of the first pressure control solenoid, a second inlet in downstream fluid communication with the outlet of the second pressure control solenoid, and an outlet in upstream fluid communication with a valve control solenoid.

10. The hydraulic control system of claim 9 wherein the valve control solenoid includes an outlet in upstream fluid communication with the valve assembly and the valve control solenoid is configured to communicate a pressurized hydraulic fluid from the first pressure control solenoid or the second pressure control solenoid to the valve assembly in order to move the valve of the valve assembly to one of the first and second positions.

11. The hydraulic control system of claim 7 wherein the source of pressurized hydraulic fluid includes a pump and an accumulator.

12. A hydraulic control system for controlling a dual clutch transmission having a plurality of synchronizers, the hydraulic control system comprising:

a source of pressurized hydraulic fluid;

a first and a second pressure control solenoid each having an inlet port in downstream fluid communication with the source of pressurized hydraulic fluid and each having an outlet port;

a first flow control solenoid having an inlet port in downstream fluid communication with the outlet port of the first pressure control solenoid and having an outlet port;

a second flow control solenoid having an inlet port in downstream fluid communication with the outlet port of the first pressure control solenoid and having an outlet port;

a first clutch actuator in downstream fluid communication with the outlet port of the first flow control solenoid, the first clutch actuator configured to selectively actuate a first clutch of the dual clutch transmission;

a second clutch actuator in downstream fluid communication with the outlet port of the second flow control solenoid, the second clutch actuator configured to selectively actuate a second clutch of the dual clutch transmission;

a third flow control solenoid having an inlet port in downstream fluid communication with the outlet port of the second pressure control solenoid and having an outlet port;

a valve assembly having a first inlet port in downstream fluid communication with the outlet port of the second pressure control solenoid, a second inlet port in downstream fluid communication with the outlet port of the third flow control solenoid, and first, second, third, and fourth outlet ports, wherein the valve assembly has a valve movable between a first and a second position, wherein the first inlet is in fluid communication with the second outlet port and the second inlet is in fluid communication with the fourth outlet port when the valve is in the first position and wherein the first inlet is in fluid communication with the first outlet port and the second inlet is in fluid communication with the third outlet port when the valve is in the second position;

a fourth flow control solenoid having an inlet port in downstream fluid communication with the first outlet port of the valve assembly and having an outlet port;

a fifth flow control solenoid having an inlet port in downstream fluid communication with second outlet port of the valve assembly and having an outlet port;

a first actuator in downstream fluid communication with the first outlet port of the valve assembly and the outlet port of the fourth flow control solenoid, wherein the first actuator is movable between a first and second position when the valve of the valve assembly is in the second position and a flow of hydraulic fluid from the fourth flow control solenoid generates a force on the first actuator that is greater than or less than a force on the first actuator generated by a pressurized hydraulic fluid from the second pressure control solenoid;

a second actuator in downstream fluid communication with the first and third outlet ports of the valve assembly, wherein the second actuator is movable between a first and second position when the valve of the valve assembly is in the second position and a flow of hydraulic fluid from the third flow control solenoid generates a force on the second actuator that is greater than or less than a force on the second actuator generated by a pressurized hydraulic fluid from the second pressure control solenoid;

a third actuator in downstream fluid communication with the second and fourth outlet ports of the valve assembly, wherein the third actuator is movable between a first and second position when the valve of the valve assembly is in the first position and a flow of hydraulic fluid from the third flow control solenoid generates a force on the third actuator that is greater than or less than a force on the third actuator generated by a pressurized hydraulic fluid from the second pressure control solenoid; and a fourth actuator in downstream fluid communication with the second outlet port of the valve assembly and with the outlet port of the fifth flow control solenoid, wherein the fourth actuator is movable between a first and second position when the valve of the valve assembly is in the first position and a flow of hydraulic fluid from the fifth flow control solenoid generates a force on the fourth actuator that is greater than or less than a force on the fourth actuator generated by a pressurized hydraulic fluid from the second pressure control solenoid, and wherein selective engagement of the first, second, third, and fourth actuators controls the plurality of synchronizers and selective engagement of the first and second clutch actuators controls the first and second clutches.

13. The hydraulic control system of claim 12 further comprising a valve control solenoid having an inlet port in downstream fluid communication with the first pressure control solenoid and an outlet in upstream fluid communication with the valve assembly, wherein the valve control solenoid is configured to communicate a pressurized hydraulic fluid from the first pressure control solenoid to the valve assembly in order to move the valve of the valve assembly to one of the first and second positions.

14. The hydraulic control system of claim 12 wherein the source of pressurized hydraulic fluid includes a pump and an accumulator.

* * * * *